US006442018B1

(12) United States Patent
Dinkin

(10) Patent No.: US 6,442,018 B1
(45) Date of Patent: *Aug. 27, 2002

(54) BRIEFCASE COMPUTER

(75) Inventor: Sam Dinkin, Austin, TX (US)

(73) Assignee: International Business Machine Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/452,386

(22) Filed: Dec. 1, 1999

(51) Int. Cl.$^7$ .................................................. G06F 1/16
(52) U.S. Cl. ........................ 361/683; 361/680; 206/305; 248/118.1
(58) Field of Search .......................... 361/683, 686–687, 361/681–682, 796, 390–395, 700–710, 692–697, 674–680; 364/708, 708.1, 709, 710; 219/130.01; 211/41.26, 59.4; 248/917–923, 118, 118.1, 118.2; 345/905, 168–169, 903; 206/320, 305, 576; 400/715; 190/108–111

(56) References Cited

U.S. PATENT DOCUMENTS

| | | | | |
|---|---|---|---|---|
| 4,232,382 A | * | 11/1980 | Heinsen et al. ................. 368/1 |
| 4,268,913 A | * | 5/1981 | Nakagiri et al. ............... 368/10 |
| 4,294,496 A | | 10/1981 | Murez | |
| 4,796,735 A | * | 1/1989 | Horiuchi ..................... 190/109 |
| 4,895,231 A | * | 1/1990 | Yamaguchi et al. ......... 190/115 |
| D306,433 S | * | 3/1990 | Mitchel ...................... D14/106 |
| 5,083,042 A | * | 1/1992 | Merchant .................... 340/601 |
| 5,214,574 A | | 5/1993 | Chang | |
| 5,260,884 A | * | 11/1993 | Stern ........................ 364/708.1 |
| 5,305,183 A | * | 4/1994 | Teynor ........................ 361/686 |
| 5,325,970 A | * | 7/1994 | Dillon et al. ................ 206/576 |
| 5,437,367 A | * | 8/1995 | Martin ........................ 206/320 |
| 5,448,446 A | * | 9/1995 | Honda et al. ............. 364/708.1 |
| 5,596,482 A | * | 1/1997 | Horikoshi .................... 361/683 |
| 5,647,484 A | * | 7/1997 | Fleming ...................... 206/576 |
| 5,671,833 A | * | 9/1997 | Edwards et al. ........... 191/12.2 |
| 5,862,392 A | * | 1/1999 | Charkey et al. ....... 395/750.01 |
| 5,878,002 A | * | 3/1999 | Pfeil ............................ 368/10 |
| D414,751 S | * | 10/1999 | Yogalingham .............. D14/106 |
| 5,992,155 A | * | 11/1999 | Kobayashi et al. ............ 62/3.7 |
| 6,014,713 A | * | 1/2000 | Agnew et al. ............... 395/800 |
| 6,028,764 A | * | 2/2000 | Richardson et al. ......... 361/681 |
| 6,046,754 A | * | 4/2000 | Stanek ........................ 345/905 |
| 6,091,546 A | * | 7/2000 | Spitzer ........................ 359/618 |
| 6,105,763 A | * | 8/2000 | Saetia ......................... 206/320 |
| 6,112,984 A | * | 9/2000 | Snavely ...................... 235/379 |
| 6,137,675 A | * | 10/2000 | Perkins ....................... 361/679 |
| 6,195,255 B1 | * | 2/2001 | Kim ........................... 361/683 |
| 6,195,921 B1 | * | 3/2001 | Truong ......................... 36/136 |
| 6,208,504 B1 | * | 3/2001 | Cho et al. ................... 361/683 |
| 6,257,407 B1 | * | 7/2001 | Truwit et al. ............... 206/320 |

* cited by examiner

*Primary Examiner*—Darren Schuberg
*Assistant Examiner*—Michael Datskovsky
(74) *Attorney, Agent, or Firm*—Stephen C. Kaufman, Esq.; McGinn & Gibb, PLLC

(57) ABSTRACT

A carrying case (and an integrated briefcase computer including the carrying case) includes a housing having first and second container portions which are selectively opened and closed, the first and second container portions being coupled together, a computer including central processing unit (CPU) integrally housed in one of the first and second container portions of the housing, a liquid crystal display (LCD) screen located in the other of the first and second container portions of the housing, and a keyboard, removably housed in the one of the first and second container portions, for communicating with the LCD screen.

17 Claims, 4 Drawing Sheets

BRIEFCASE COMPUTER

BACKGROUND OF THE INVENTION

1. Field of the Invention

The present invention generally relates to a briefcase carrying device with an integrated portable computer (e.g., a "laptop" computer).

2. Description of the Related Art

Conventional portable computer systems (e.g., "laptops") are becoming more and more prevalent in business, especially by business travelers, etc. The conventional systems typically utilize liquid crystal display (LCD) screens for their output (display) devices.

However, the sizes of such screens have continually increased over the years. Thus, a problem arises in that as the screens continue to grow, the LCD screens will eventually grow larger than the form factor for a laptop computer.

Secondly, portable computers are inherently fragile and/or contain sensitive information thereon. Accordingly, a passenger (e.g., an airline traveler, train traveler, etc.) typically "carries-on" the portable computer into the passenger compartment of an airplane, train, etc.

However, yet another problem arises in that airlines etc. typically limit a passenger's carry-on baggage to two small bags, or, for some flights, to only one carry-on bag. Airline passengers (especially business travelers) typically travel with a briefcase, a laptop and a laptop case (e.g., yet another piece of luggage). As a result, the passenger typically must check one of these bags and must spend valuable time at the "Baggage Claim" area of the airport. Further, if the laptop is checked, costly or irreparable damage may occur during baggage handling.

Yet another problem is that battery life is generally considered insufficient in today's laptop computers. While lithium batteries have made great strides over Nickel-cadmium (Nicad) batteries in increasing a usable time period of the portable computer, generally the battery life is still deemed insufficient. As a result, typically the traveler will pack in the laptop an additional battery (ies). However, the laptop becomes too heavy when loaded with such battery (ies) to extend service life sufficiently. This is a problem.

Fourth, as costs of laptops drop, the casing and carrying bag are becoming a more substantial fraction of the costs of producing a laptop.

Finally, the notebook (laptop) computer is not an attractive form factor because the notebook computer basically looks like a block of plastic. It is bulky and lumpy. The laptop carrying case is typically made of nylon and is relatively unattractive, and in some cases appears to have low quality (e.g., looks "cheap"). In contrast, after years of style evolution, the briefcase is typically attractively upholstered in leather. The handle and clasps are integrated into the design. The stitching denotes craftsmanship and quality, and is often secured from entry with a key or combination. The briefcase is a mature, well-evolved attractive form factor.

Hitherto, the invention there has been no structure integrating the attractive looking briefcase with the relatively unattractive form factor of the laptop computer.

SUMMARY OF THE INVENTION

In view of the foregoing and other problems of the conventional structures, an object of the present invention is to provide a structure for combining a portable computer and a briefcase into a convenient and attractive looking carrying case.

In a first aspect of the present invention, a carrying case (and an integrated briefcase computer including the carrying case) includes a housing having first and second container portions which are selectively opened and closed, the first and second container portions being coupled together, a computer including central processing unit (CPU) integrally housed in one of the first and second container portions of the housing, a liquid crystal display (LCD) screen located in the other of the first and second container portions of the housing, and a keyboard, removably housed in the one of the first and second container portions, for communicating with the LCD screen.

In a second aspect of the invention, an integrated briefcase with a computer houses a liquid crystal display (LCD) screen in the inside top cover and the LCD screen can be covered by folder holders which are attachable by a fastening mechanism, such as a snap, velcro strips and hooks, leather loops and knobs, etc. Basically, any device suitable for holding up a folder holder in a briefcase can be employed. The LCD screen can range in size, but a maximum size would be limited to the inside boundary of the inside top cover of the briefcase.

With the inventive configuration, a portable computer and a briefcase can be combined into a convenient carrying case with an attractive form factor, and can include a large LCD screen, with space for peripheral equipment and office materials. Further, a traveler need not check such a structure as "checked baggage", thereby saving valuable time (and potentially costly repairs) by not having to check such a structure with airport/train officials.

Other advantages include that the electronics of the laptop are embedded into the body of the briefcase, thereby providing better heat dissipation. In addition, reuse of structural support components allows a reduction in total weight Additionally, embedding the battery in the briefcase body will allow additional flexibility in placement of components. Thus, more standard and bulkier shapes can be used, thereby reducing cost.

Further, a keyboard portion can be used without a briefcase portion for office/home office activity. Thus, the keyboard portion can be detachable, and the keyboard can be used with a monitor alone. Using a normal laptop requires a separate keyboard for use with a monitor because the built-in monitor is not detachable.

Additionally, the briefcase computer preferably accommodates a full-size keyboard. Moreover, the keyboard portion can be transported alone between two sites (e.g., such as home and office) that each have power and a monitor which saves on weight. Further, the keyboard portion can be used separately if the LCD screen burns out (or otherwise becomes defective) or if there is a flaw in manufacturing.

BRIEF DESCRIPTION OF THE DRAWINGS

The foregoing and other objects, aspects and advantages will be better understood from the following detailed description of a preferred embodiment of the invention with reference to the drawings, in which:

FIG. 6 illustrates a configuration including extra hinges 60 for allowing the laptop to be used in large form factor accommodations such as airline coach seats or the like.

DETAILED DESCRIPTION OF A PREFERRED EMBODIMENT OF THE INVENTION

Figure 1:
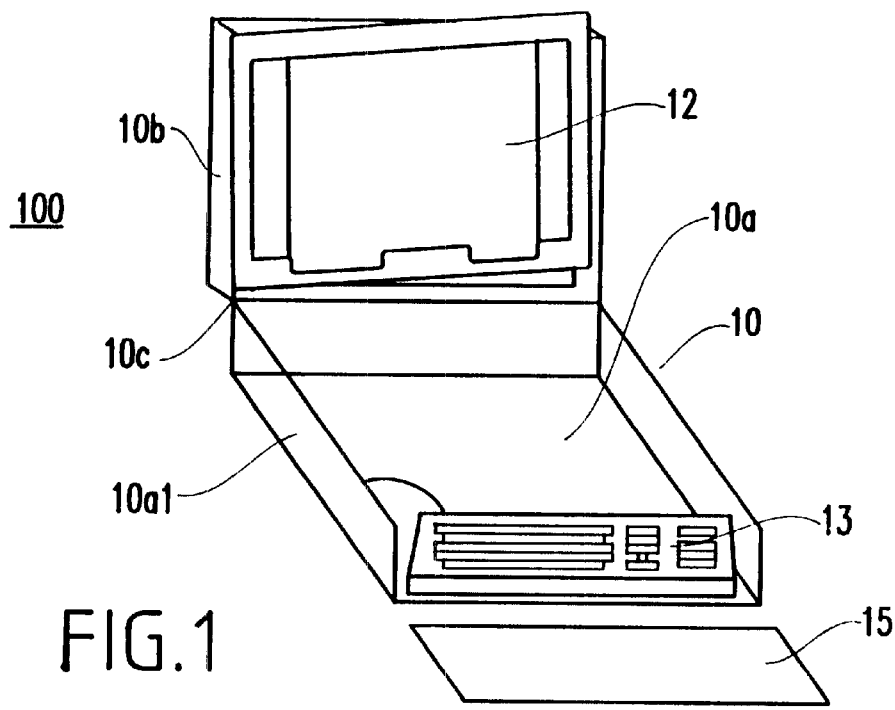
FIG. 1 is a schematic diagram illustrating a preferred embodiment of the structure 100 according to the present invention, in an operational condition with a liquid crystal display (LCD) screen 12 visible to the user.

Referring now to the drawings, and more particularly to FIGS. 1-6, an integrated briefcase and computer according to a preferred embodiment of the present invention will be described. Generally, the invention provides a new form factor for portable computers.

Preferred Embodiment

As shown in FIG. 1, a briefcase computer structure 100 is shown includes a briefcase 10 and an LCD screen 12.

As is typical, the briefcase has a two-piece configuration including a bottom box-like container portion 10a having a bottom surface, and three upstanding wall members 10a1 preferably rigidly coupled to the bottom surface of the bottom container portion 10a. Another wall member 15, described in further detail below, is foldably coupled to the bottom surface, via hinges (not shown in FIG. 1) or the like. Preferably, at least a portion of the housing (e.g., the portion near the LCD screen and/or a CPU of the computer) includes an insulation material and/or a heat dissipating material (e.g., as shown by reference numeral 12A in FIG. 9).

The bottom portion 10a is coupled to a top box-like container portion 10b via a coupling structure 10c such as hinges, fasteners, etc. The inside top of the briefcase 10 houses the LCD screen 12. A keyboard 13 (e.g., a full-size keyboard) is a component form factor.

Preferably, the bottom of the keyboard has the same finish as the inside of the briefcase 10. That is, when the keyboard 13 is turned upside down, it should have the same finish as the inside of the briefcase 10, to provide an aesthetic appeal. (The keyboard shown in FIG. 2 is upside down).

Figure 2:
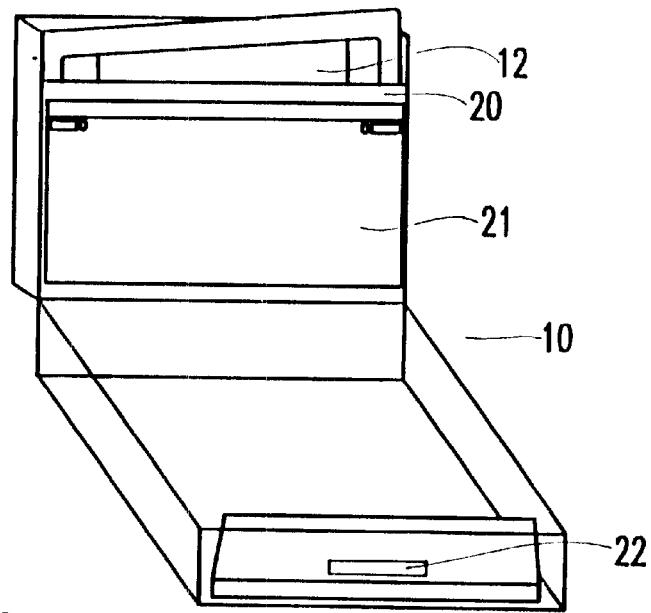
FIG. 2 is a schematic diagram illustrating the preferred embodiment of the structure 100 of the present invention, with the LCD screen 12 being covered by folders 21 of a briefcase.

Conventional folder holders 20, shown in FIG. 2, fold up to cover the LCD screen 12 or fold down to cover up items in the briefcase 10.

Figure 3A:
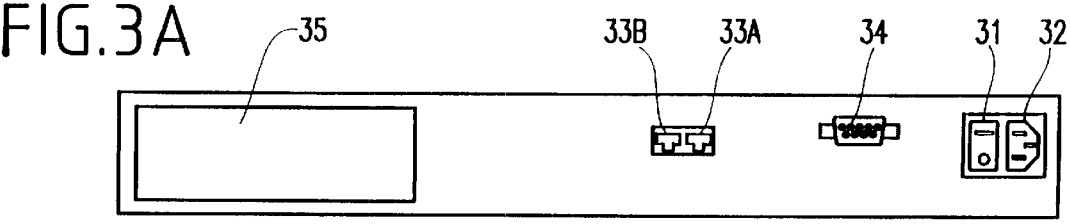
FIG. 3A is a schematic diagram illustrating the back portion of a keyboard 13.

As shown in FIG. 3A, which illustrates a back portion of the keyboard, including a power cord 32, a telephone cord 33, a network cord 34, and other optional cables (or) ports (not shown) are provided at the back of the keyboard 13.

More specifically, there is a power-on switch 31, a spring-loaded reeled out AC power-in cable 32, a spring-loaded, reeled out combination video and DC-power cable 34 for connecting the rest of the briefcase computer, a spring-loaded reeled out telephone cable, and a spring-loaded, reeled out network cable. A disk/CD bay 35 is also provided. The cords preferably reel in when not in use, by spring-loaded retractors or the like. The plugs and cords are hidden from view when the keyboard 13 is turned over, as shown in FIG. 2.

As mentioned above, the bottom container portion 10a of the briefcase 10 includes the foldable, preferably removable wall member 15. Member 15 is preferably located at the front of the briefcase 10 and slides up and completely removes by sliding up out of a groove to become a wrist rest. Latches (not shown) are preferably provided on sides of case. Such a wrist rest assists in helping the user avoid repetitive motion injury such as carpal tunnel syndrome.

As shown in FIG. 2, a briefcase handle 22 is inset so that the wall member/wrist rest 15 lies flat on a table. The briefcase computer keyboard 13 rests on top of the folder holder 20, inside the briefcase 10 (especially, in close quarters such as on an airplane) or partially or fully outside the briefcase 10. The flaps 21 on the top of the case are hinged to swing outwardly and behind the monitor. Looking at the monitor, the left flap would swing left and then back from the LCD screen 12 to allow a maximum viewable angle. This is an optional portion of the invention.

The keyboard 13 is an integral portion of the briefcase computer and has a maximum width limited to the maximum length of the available space within the interior of the briefcase computer. The keyboard 13 preferably includes a built-in computer mouse or the user can attach a conventional external mouse device.

As mentioned above, the keyboard 13 has attached cables which retract and are hidden from view when the keyboard is turned over including a retractable power cord, a network cord, a telephone cable for dial-up modem connections, and for attachment of other external devices.

Additionally, the keyboard may comprise a single unit including a central processing unit (CPU), disk drive, etc or these elements may be located elsewhere in the briefcase. For example, these elements may be located in the sides or bottom.

Figure 3B:
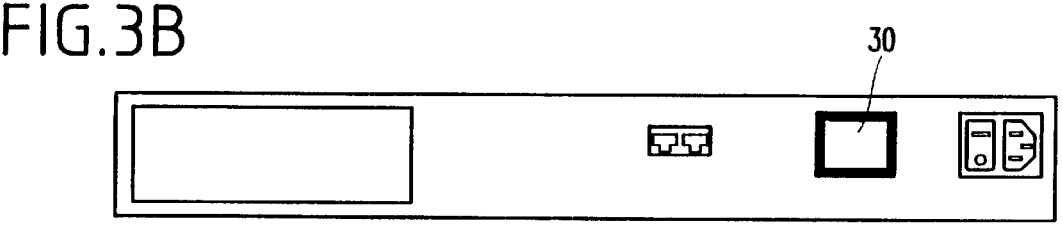
FIG. 3B is another schematic diagram illustrating the back portion of the keyboard 13 having an infrared transmitter port 30.

The keyboard 13 may also be cordless. For example, the keyboard may rely on an infrared (IR) transmission, whereby no cable connection to the monitor is necessary. FIG. 3B illustrates the back of the keyboard in which an IR transmitter port 30 is provided. In such a case, the IR transmitter port 30 in the keyboard 13 would require a line-of-sight connection with an IR receiver.

The configuration of the internal portion of the briefcase may vary depending upon the specifications of the hardware combined into the briefcase computer, but may include storage space for peripheral equipment such as a portable printer, scanner, extra batteries, power pack, DVD/CD ROM device, adaptors, etc.

The top edge of the computer, housing the recessible handle 22, opposite the connector (e.g., hinge) for the top cover portion 10b and the bottom portion 10a of the briefcase, is able to fold-out when the briefcase is opened to function as a wrist rest. The handle 22 is recessed allowing the wrist rest to lie flat. The handle 22 is easily retractable and insertable into the wrist rest. The inside portion on which the user's wrist rests is preferably made of a comfortable material such as silicone, rubber, padded leather, or interior material of the briefcase.

Audio output components, such as speakers or the like, for use with computer software and the sound card, if so equipped, of the computer, may be built into the LCD screen, the keyboard, or some portion of the briefcase itself.

The construction of the frame (e.g., as shown by reference numeral 90 in FIG. 8) can be of any strong lightweight material such as aluminum, fiberglass, titanium, plastic resin, Kevlar, and rubber. For ease of use and improved utility, the briefcase may include any one or more of retractable wheels on the bottom edge of the briefcase (e.g., as shown by reference numeral 45 in FIG. 4A), a telescopic handle built into the side of the case (e.g., as shown by reference numeral 46 in FIG. 4B), business card holders, pen holders, diskette and optical disk holders, and/or a retractable shoulder strap.

Additionally, a locking mechanism could be provided on the outside of the computer which if violated would render the computer inoperative, in the instance, for example, of theft or tampering. Further, construction of the briefcase may include materials for blocking magnetic charges, such as those produced by magnetic airline tray tables and or radiation from security devices.

There are several key benefits and advantages resulting from the invention as described above. Specifically, the invention will attractively house a large size LCD screen. There is no other candidate for the next form factor once screens become too big for laptops.

The briefcase computer is the most compact form factor for the functionality of a briefcase and the functionality of a computer and reduces the number of pieces of luggage a traveler, particularly a traveler on business may need to carry onto the plane. This allows business travelers to check little or no baggage, and thus saves time reclaiming luggage at the baggage claim area.

Weight is a key competitive characteristic for portable computers. Such a computer/briefcase combination can reduce the total carried weight substantially, by integrating component parts of the computer into the briefcase structure. This savings can be used to increase battery size, weight and functionality while still reducing the total carried weight from a laptop, laptop bag and briefcase.

The housing of a briefcase and the housing of a computer are redundant. Integrating the two results in less expense than for a laptop computer and a high quality briefcase produced separately. The cost of portable computers is continually decreasing, and some portable computers will surely cost less than some briefcases.

Further, the computer is becoming a wearable item, practically a fashion accessory. Wallet phones and computers (e.g., personal data assistants, palm pilots, etc.) are becoming pocket-sized. However, a wallet computer does not now function as a wallet. That is, it cannot store paper money and credit cards. Attractively housing a larger computer requires finding a larger container in another piece of a business person's wardrobe. The briefcase computer solves these two problems. That is, the combination allows an executive to effectively have all required business materials at hand, e.g., a virtual office, even during traveling. Further, the briefcase computer does so preserving the function of the traditional fashion item it replaces.

Thus, less weight for the combination of a briefcase computer compared with the separate parts is an advantage as well as fewer pieces of equipment and luggage to handle, particularly while traveling, as compared with the current situation of carrying a laptop, a laptop case and a briefcase.

The briefcase computer according to the invention is an attractive larger form factor that can house large LCD screens (e.g., larger than a typical laptop screen), a laptop case, and a briefcase. Finally, the briefcase computer with a nicely finished exterior may be more appealing aesthetically than the human factor of existing computer designs.

Figure 3C:
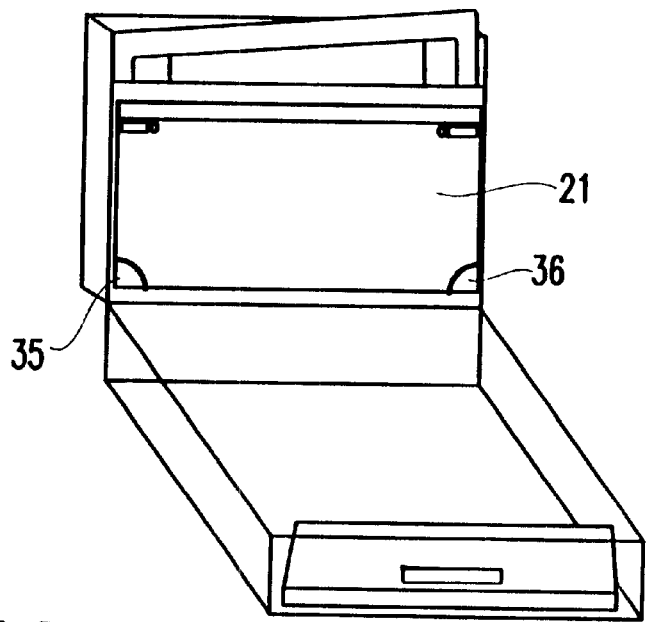
FIGS. 3C and 3D respectively illustrate exemplary modifications the briefcase computer according to the present invention.
Figure 3D:
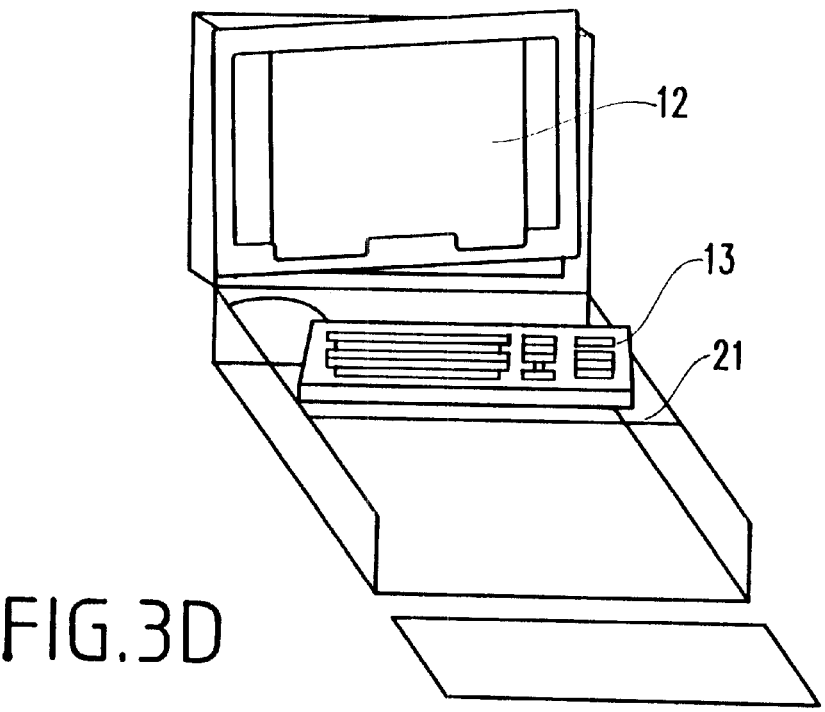

FIGS. 3C and 3D illustrate other configurations of the briefcase computer. It is noted that an arc 35 in one corner of the folders 21 provides an ability to pull a cord through the folders 21 and connect the same to the back of the keyboard 13, as shown in FIG. 3C. The other arc 36 may be provided solely for symmetry.

FIG. 3D illustrates the ability to use the keyboard on top of the folders 21 of the briefcase (e.g., similarly to a conventional laptop) in cramped areas.

Figure 4A:
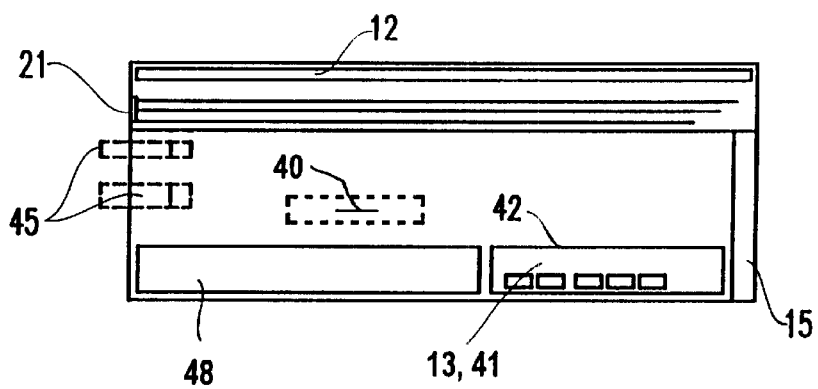
FIGS. 4A and 4B are schematic diagrams respectively illustrating the side cross-sectional views of the briefcase computer in an opened state and a closed state.
Figure 4B:
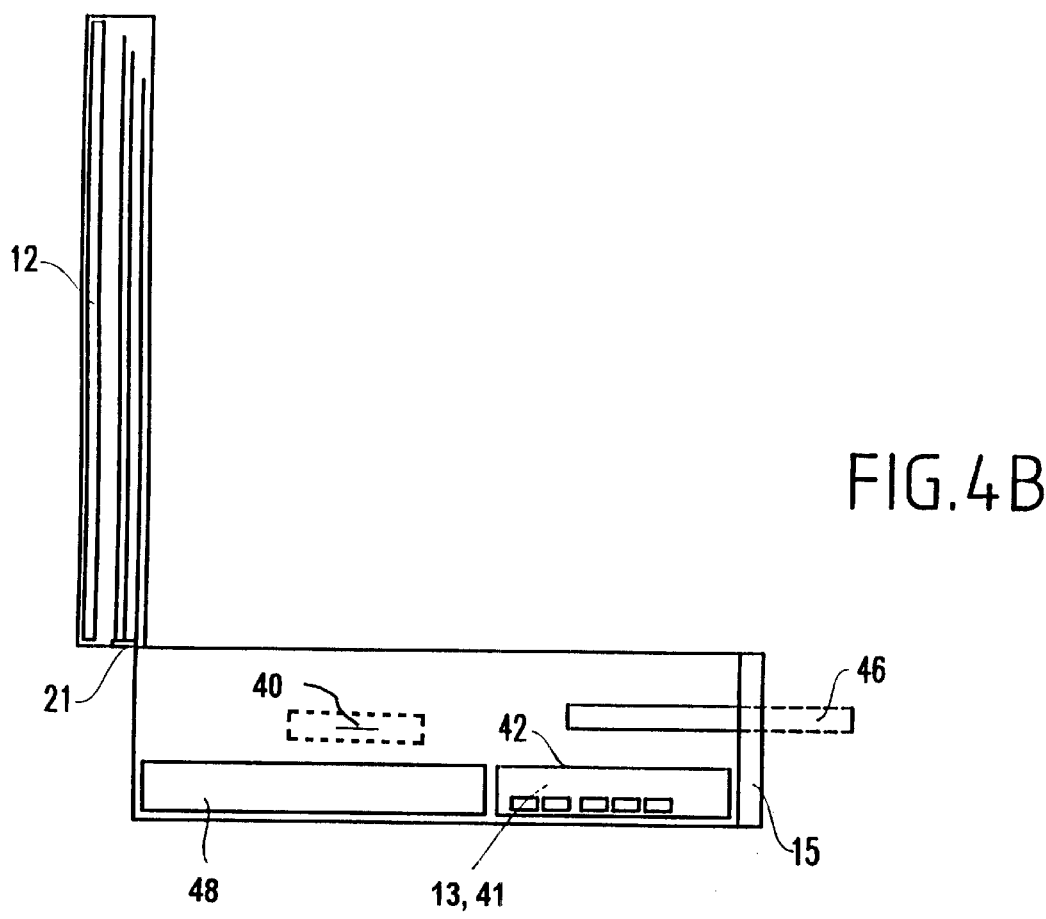

FIGS. 4A and 4B illustrate the closed state and the open state of the briefcase computer, respectively. The keyboard in both Figures is shown in an upside down state.

In FIG. 4A, the LCD monitor 12 is shown along with an extra battery/extra drive bay 48. Additionally, the keyboard 13, CPU 40, disk 41, etc. are shown. It is noted that reference numeral 42 represents the matching interior trim on the bottom of the keyboard 13. Also shown is the removable combination briefcase top/wrist rest 15 with the inset handle.

FIG. 4B illustrates the briefcase computer in an open state.

Figure 5:
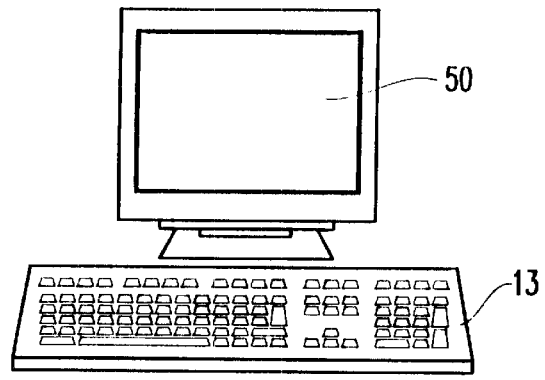
FIG. 5 illustrates a computer monitor with a keyboard in which the keyboard is separately usable from the monitor.

FIG. 5 illustrates a computer monitor 50 with a keyboard 13 in which the keyboard 13 is separately usable from the briefcase portion for office/home office activity. That is, the keyboard 13 can be used with a monitor 50 alone.

Figure 6:
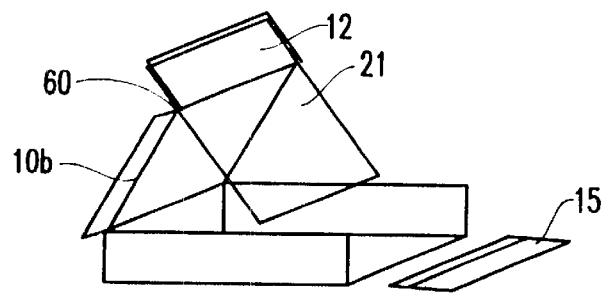

Finally, FIG. 6 illustrates yet another configuration in which extra hinges 60 are provided for allowing the laptop to be used in large form factor accommodations such as airline coach seats or the like.

Thus, with the inventive configuration, a portable computer and a briefcase can be combined into a convenient carrying case with an attractive form factor, and a large LCD screen, with space for peripheral equipment and office materials. Further, laptop cases are stolen much more frequently than briefcases. With the inventive configuration and by being integrated within a briefcase, the laptop computer can be camouflaged to look like a briefcase. Further, the briefcase computer preferably accommodates a full size keyboard.

While the invention has been described in terms of a preferred embodiment, those skilled in the art will recognize that the invention can be practiced with modification within the spirit and scope of the appended claims.

Thus, for example, instead of a briefcase, the computer could be styled to unobtrusively fit into a particular them of attire (e.g., formal, casual, picnic, beach, wedding, or other attire).

Moreover, as mentioned above, the computer can be a wearable item such as a fashion accessory. Such a fashion accessory can include any of a carrying case, wrist watch, glasses, wallet, briefcase, belt, shoes, handbag, hat, jewelry, pen, backpack, walking stick, etc.

Such fashion accessories can be tailored and designed by one of ordinary skill in the art, after reading the present specification, to incorporate one or more central processing units (CPU), a digital memory (e.g., a random access memory (RAM)) coupled to the CPU(s), a video output, operatively coupled to the CPU(s) and preferably having 640×480 (Video Graphics Adaptor (VGA)) or higher resolution, one or more input devices (e.g., keyboard, mouse, trackpoint, microphone, trackball, etc.), and one or more power sources (e.g., common household AC and/or DC storage device, etc.). However, even with such incorporation of such a computer and peripherals, the fashion accessory retains the original function of the accessory. Further, the computer and peripherals are contained within a housing which has the exterior appearance of a non-computer accessory (e.g., the appearance of the fashion accessory).

Having thus described my invention, what I claim as new and desire to secure by Letters Patent is as follows:

1. A carrying case comprising:
    a housing having first and second container portions which are selectively opened and closed, said first and second container portions being coupled together and at least one of the first and second container portions having a hinged wall member movable in first and second positions including a wrist rest integrated into an inside face thereof,
    a computer including a central processing unit (CPU) integrally housed in one of said first and second container portions of said housing;
    a liquid crystal display (LCD) screen located in the other of said first and second container portions of said housing; and
    a keyboard, removably housed in said one of said first and second container portions, for communicating with said LCD screen,
    wherein said housing comprises a recessible carrying handle in said hinged wall member.

2. The carrying case as claimed in claim 1, wherein said liquid crystal display (LCD) screen has a size substantially the same as an interior dimension of the other of said first and second container portions of said housing.

3. The carrying case as claimed in claim 1, further comprising:
    a folder holder foldably attached to said one of said first and second container portions for covering said LCD screen.

4. The carrying case as claimed in claim 1, wherein said keyboard comprises a wireless keyboard connecting to the CPU via an infrared connection.

5. The carrying case as claimed in claim 1, wherein said hinged wall member is foldable from said one of said first and second container portions at an angle of approximately 90 degrees.

6. The carrying case as claimed in claim 1, wherein said wrist rest comprises at least one of silicone, rubber, padded leather, and an interior material of said housing.

7. The carrying case as claimed in claim 1, further comprising:
    a plurality of retractable wheels located on an exterior edge of the housing; and
    a telescopic handle formed in said housing.

8. The carrying case according to claim 1, wherein said housing has a predetermined space for accommodating business and non-business items of a user of said carrying case.

9. The carrying case according to claim 1, further comprising:
    a battery stored in said one of said first and second container portions and for being coupled to said computer.

10. The carrying case according to claim 1, wherein at least a portion of said housing includes at one least one of an insulation material and a heat dissipating material.

11. An integrated briefcase computer comprising:
    a housing having first and second container portions which are selectively opened and closed, said first and second container portions being coupled together and at least one of the first and second container portions having a hinged wall member movable in first and second positions including a wrist rest integrated into an inside face thereof;
    a computer including a central processing unit (CPU) integrally housed in one of said first and second container portions of said housing;
    a display located in the other of said first and second container portions of said housing; and
    a keyboard, removably housed in said one of said first and second container portions, or communicating with said display,
    wherein said housing comprises a recessible carrying handle in said hinged wall member.

12. The integrated briefcase computer as claimed in claim 11, wherein said display comprises a liquid crystal display (LCD) screen having a size substantially the same as an interior dimension of the other of said first and second container portions of said housing.

13. The integrated briefcase computer as claimed in claim 11, further comprising:
    a folder holder foldably attached to said one of said first and second container portions for covering said display.

14. The integrated briefcase computer as claimed in claim 11, wherein said keyboard comprises a wireless keyboard connecting to the CPU via an infrared connection.

15. The integrated briefcase computer as claimed in claim 11, wherein hinged wall member is foldable from said one of said first and second container portions at an angle of 90 degrees.

16. The integrated briefcase computer according to claim 11, wherein said housing has a predetermined space for accommodating business and non-business items personal to a user of said briefcase computer.

17. A briefcase comprising:
    a housing having first and second container portions which are selectively opened and closed, said first and second container portions being coupled together and at least one of the first and second container portions having a hinged wall member movable in first and second positions including a wrist rest integrated into an inside face thereof;
    a computer integrally formed within said housing and including a central processing unit (CPU) integrally housed in one of said first and second container portions of said housing;
    a display located in the other of said first and second container portions of said housing; and
    a keyboard, removably housed in said one of said first and second container portions, for communicating with said display,
    wherein said housing comprises a recessible carrying handle in said hinged wall member.

* * * * *